United States Patent [19]

Davies et al.

[11] Patent Number: 6,080,804
[45] Date of Patent: *Jun. 27, 2000

[54] SPRAY DRYING OF FUNCTIONALIZED POLYACRYLAMIDE MICROEMULSIONS

[75] Inventors: William Bloor Davies, Darien, Conn.; Gary Kaui Lani Miller, Port Chester, N.Y.

[73] Assignee: Cytec Technology Corp., Wilmington, Del.

[ * ] Notice: This patent is subject to a terminal disclaimer.

[21] Appl. No.: 08/479,057

[22] Filed: Jun. 7, 1995

[51] Int. Cl.⁷ .................................................... C08K 3/26
[52] U.S. Cl. .................... 523/340; 524/280; 524/394; 524/396; 524/416; 524/417; 524/425; 524/521; 524/555; 524/815; 524/827; 525/198; 525/218; 528/502 E; 528/502 R; 528/503
[58] Field of Search ....................... 524/394, 831, 524/829, 555, 521, 815, 827, 280, 416, 417, 425, 396; 526/306; 523/340; 525/198, 218; 528/502 E, 502 R, 503

[56] References Cited

U.S. PATENT DOCUMENTS

| | | | |
|---|---|---|---|
| 3,171,805 | 3/1965 | Suen et al. | 210/54 |
| 3,259,570 | 7/1966 | Priesing et al. | 210/53 |
| 3,418,237 | 12/1968 | Booth et al. | 210/54 |
| 3,803,111 | 4/1974 | Munro et al. | 260/89.5 S |
| 3,826,771 | 7/1974 | Anderson et al. | 260/29.6 |
| 4,035,317 | 7/1977 | Gershberg | 521/97 |
| 4,079,027 | 3/1978 | Phillips et al. | 524/555 |
| 4,112,215 | 9/1978 | Boessler et al. | 528/503 |
| 4,230,608 | 10/1980 | Mura | 524/475 |
| 4,390,659 | 6/1983 | Stanley, Jr. et al. | 524/555 |
| 4,405,728 | 9/1983 | Krebs et al. | 524/555 |
| 4,707,290 | 11/1987 | Seiter et al. | 252/140 |
| 4,720,346 | 1/1988 | Flesher et al. | 210/734 |
| 4,747,880 | 5/1988 | Berrido et al. | 106/207 |
| 4,754,008 | 6/1988 | Siol et al. | 526/224 |
| 4,798,888 | 1/1989 | Symes et al. | 536/123 |
| 4,943,378 | 7/1990 | Flesher et al. | 210/725 |
| 4,946,654 | 8/1990 | Uhlemann et al. | 422/140 |
| 4,956,399 | 9/1990 | Kozakiewicz et al. | 523/223 |
| 4,956,400 | 9/1990 | Kozakiewicz | 524/829 |
| 4,999,323 | 3/1991 | Sang et al. | 501/103 |
| 5,025,004 | 6/1991 | Wu et al. | 514/165 |
| 5,037,881 | 8/1991 | Kozakiewicz et al. | 524/812 |
| 5,109,062 | 4/1992 | Robinson et al. | 524/815 |
| 5,132,023 | 7/1992 | Kozakiewicz et al. | 210/734 |
| 5,286,806 | 2/1994 | Neff et al. | 525/369 |
| 5,596,056 | 1/1997 | Nambu et al. | 526/207 |
| 5,621,055 | 4/1997 | Miyanaga et al. | 526/225 |
| 5,650,465 | 7/1997 | Ryan et al. | 524/801 |
| 5,658,979 | 8/1997 | Verma et al. | 524/437 |
| 5,698,627 | 12/1997 | Oguni et al. | 524/724 |
| 5,795,926 | 8/1998 | Niessner et al. | 523/339 |
| 5,849,862 | 12/1998 | Davies et al. | 528/502 E |

FOREIGN PATENT DOCUMENTS

| | | |
|---|---|---|
| 672769 | 10/1963 | Canada . |
| 0 304 243 A1 | 8/1988 | European Pat. Off. . |
| 0 465 964 A1 | 6/1991 | European Pat. Off. . |
| 54154614 | 12/1979 | Japan . |
| 04145131A | 5/1992 | Japan . |
| 04185606A | 7/1992 | Japan . |
| 04244020A | 9/1992 | Japan . |
| 1115653 | 6/1965 | United Kingdom ............. G03G 1/20 |

OTHER PUBLICATIONS

A. Siciliano, J. Biomater. Appl. 6(4) 326–339 (1992) Abstract Only.

Kirk–Othmer—Encyclopedia of Chemical Technology, 4th Edition, vol. 8, John Wiley & Sons, New York, 1993, pp. 505–508.

Primary Examiner—Judy M. Reddick
Attorney, Agent, or Firm—Frank M. Van Riet; Joseph J. Mallon; Liza Negron

[57] ABSTRACT

Processes for producing free flowing, Mannich and glyoxal polyacrylamide water soluble and water-swellable granules from a water-in-oil emulsion and compositions comprising such dry polymer granules are disclosed.

22 Claims, 2 Drawing Sheets

Fig. 1

SPRAY DRYING OF FUNCTIONALIZED POLYACRYLAMIDE MICROEMULSIONS

FIELD OF THE INVENTION

This invention relates generally to processes for spray drying emulsions and microemulsions containing water-soluble or water-swellable polymers, including Mannich poly(alk)acrylamide, quaternized Mannich poly(alk)acrylamide and glyoxal poly(alk)acrylamide, to obtain substantially dry water-soluble or water-swellable polymer granules which are useful as flocculants in the water-treating, mining and paper industries, as paper additives and in oil recovery.

BACKGROUND OF THE INVENTION

High molecular weight, water-soluble polymers produced from such monomers as acrylamide are commercially and environmentally important materials. These polymers find use as flocculants for mining operations to recover ore from slurries, water treating to remove suspended impurities etc., and also are used extensively in paper making to aid paper formation and in oil recovery industries. In the production of these polymers by polymerization of their monomers, it has become increasingly important to produce as high a molecular weight polymer as possible. It has also been evident that the production of such polymers utilizing a higher monomer solids reaction media would enable the production of more useful polymers at a more economical rate. However, the combination of high polymer solids and high molecular weight has been difficult to attain through polymer preparation by solution polymerization and viscosity problems or gel formation has presented difficulties in handling and dissolution of such polymers The advent of emulsion polymerization solved some of these problems. U.S. Pat. No. 5,286,806 teaches a method in which water-soluble monomers are polymerized in a water-in-oil emulsion to form a water-in-oil emulsion of a water-soluble polymer. In that case, the polymer is hydrolyzed to further enhance the end-use properties of the polymer. U.S. Pat. Nos. 4,956,399; 4,956,400; 5,037,881; and 5,132,023, all of which are hereby incorporated herein by reference, disclose a further advance in the art by teaching that functionalization of a water-soluble polymer contained in a water-in-oil microemulsion could be carried out to produce high molecular weight charged polymers with advantageous flocculation performance. The use of microemulsion, as opposed to emulsions, in polymer production provided improved polymer performance properties among other benefits.

Despite the many benefits provided by emulsion and microemulsion polymers, transportation costs associated with such materials remained high and disposal of the oil and emulsifier in the emulsions posed environmental concerns as secondary pollution. Moreover, many emulsion and microemulsion polymers tend to exhibit stability problems, e.g. polymer degradation, which appear to be exacerbated at high temperatures.

Preparing polymers in the form of dry powders addressed the above problems associated with transportation costs and disposal problems. U.S. Pat. No. 4,798,888 describes a process of making a powdered microbial polysaccharide comprising spray drying an emulsion in a non-aqueous liquid of an aqueous solution of the microbial polysaccharide. In U.S. Pat. Nos. 4,956,399; 4,956,400; 5,037,881; and 5,132,023; non-solvent precipitation and stripping are mentioned as methods of recovering dry polymer products from water-soluble polymer microemulsions. For example, U.S. Pat. No. 4,035,317, which is hereby incorporated herein by reference, teaches that water-in-oil emulsions of water-soluble polymers may be spray dried, under certain conditions, to produce free-flowing, non-dusting polymer granules which rapidly dissolve in water. Powders of polyacrylamide, acrylamide/acrylic acid copolymer, and acrylamide/dimethylaminopropyl methacrylate copolymers are described therein. However, a difficulty nevertheless remained with respect to certain functionalized polymers, and particularly with respect to those polymers that are thermosensitive. Thermosensitive polymers tended to degrade when exposed to the high temperatures encountered during the spray drying methods described in the aforesaid patents.

Attempts made to spray dry certain polymers such as, for example Mannich polyacrylamide proved to be unsuccessful. Mannich polyacrylamides were spray dried according to the teachings in the art. The resulting polymer powder exhibited reduced flocculation performance, compared to that of the corresponding polymers used in the microemulsion form. Furthermore, the viscosities of solutions of the spray dried products tended to be significantly lower than desired.

Accordingly, there exists a need for a method of recovering a functionalized water-soluble polymer from an emulsion or a microemulsion to produce a rapidly dissolving water-soluble polymer which substantially retains its flocculation performance, can be economically transported, has good thermal stability, and leads to reduced secondary pollution.

Surprisingly, a method has now been discovered for producing functionalized water-soluble emulsion and microemulsion polymers in a substantially dry form by spray drying the corresponding polymer emulsion or microemulsion. This method may be used even when the functionalized water-soluble polymer is thermosensitive. It has also been surprisingly discovered, that substantially dry polymer produced by methods of the instant invention retain the advantageous performance properties of the corresponding microemulsion product over time. Significantly, and much to the inventors surprise, the substantially dry polymers of the instant invention have greater stability than the corresponding microemulsion polymers. The processes of the instant invention also do not have problems associated with precipitation e.g. the inconvenience and cost of using large volumes of non-solvent to precipitate the polymer, the risks associated with possible flammability and toxicity of the non-solvent, the inconvenience and cost of means such as filtration to recover the precipitated polymer, etc.

In a further embodiment of the invention, the oil phase of the emulsion or microemulsion is recovered and recycled, said oil phase being surprisingly substantially free of certain polymerization-inhibiting impurities. In a still further embodiment of the invention, an acid, base, or buffer is combined with the polymer to form a granular composition with enhanced flow properties and faster rates of polymer dissolution.

SUMMARY OF THE INVENTION

We have now discovered that functionalized polymers, such as, for example, Mannich polyacrylamide, quaternized derivatives thereof and glyoxal polyacrylamide, including thermosensitive polymers, can be recovered from water-in-oil emulsions and microemulsions to produce finely divided, free flowing polymer granules. The finely divided polymer granules of the invention are substantially free of residual oil, resulting in reduced shipping costs and greatly reduced secondary pollution during product application. The granules may be water-swellable and are preferably water-soluble. Additionally, the polymers resulting from the process of the instant invention exhibit improved stability, i.e. show less evidence of degradation compared to polymers produced and recovered by the processes known in the art. This thereby enables the production of higher molecular weight materials. Our process is particularly well-suited for the recovery of functionalized water-soluble polymers from emulsions and microemulsions, and more particularly, for the recovery of Mannich polyacrylamide, quaternized derivatives thereof and glyoxal polyacrylamide from polymer emulsions and microemulsions. Further, the finely divided polymer granules described exhibit improved thermal stability compared to the corresponding polymer microemulsion. Though we are not to be bound by any theory described herein, it is believed that the advantageous removal of residual reactants and/or undesired reaction products during the application of our novel process tends to enhance the thermal stability of the product.

In accordance with our invention, free flowing, substantially dry polymer granules are produced from a polymer-containing emulsion, by a process comprising:

spray drying a polymer emulsion or microemulsion comprised of a. a plurality of droplets, said droplets being comprised of a polymer selected from the group consisting of Mannich poly(alk)acrylamide, quaternized Mannich poly(alk)acrylamide and glyoxal poly(alk)acrylamide, and b. a volatile hydrocarbon liquid, into a gas stream with a residence time of about 8 to about 120 seconds and at an outlet temperature between about 70° C. and about 100° C. to form free flowing, substantially dry granules comprising polymer. The above-described polymers are generally water swellable and preferably water-soluble.

The substantially dry granules, which are generally water-soluble, produced by the above process and compositions comprising said dry polymers are also provided herein. In another embodiment of the invention, free flowing, substantially dry, water-soluble polymer granules are recovered from a blend of a water-soluble polymer-containing water-in-oil microemulsion and a water-soluble vinyl addition polymer-containing emulsion by a process comprising: spray drying a blend of a water-soluble polymer-containing water-in-oil microemulsion and a water-soluble vinyl addition polymer-containing water-in-oil emulsion, said polymer in said microemulsion being selected from the group consisting of Mannich poly(alk)acrylamide, quaternized Mannich poly(alk)acrylamide and glyoxal poly(alk)acrylamide, wherein said blend comprises a volatile hydrocarbon liquid, into a gas stream with a residence time of about 8 to about 120 seconds and at an outlet temperature between about 70° C. and about 100° C. to form free flowing, substantially dry, water-soluble polymer granules.

Another embodiment of the invention is a composition comprising free flowing, substantially dry, water-soluble polymer granules, said granules being comprised of a water-soluble vinyl addition polymer and a water-soluble polymer selected from the group consisting of Mannich poly(alk) acrylamide and quaternized Mannich poly(alk)acrylamide.

Yet another embodiment of the invention is a composition comprising free flowing, substantially dry, water-soluble or water-swellable polymer granules and an acid, base or buffer, said granules being comprised of a polymer selected from the group consisting of Mannich poly(alk)acrylamide and quaternized Mannich poly(alk)acrylamide. Bases and buffers are more preferred. Generally, bases, acids and buffers may be present in an amount ranging from about 0.05% to about 50.0% by weight, based on the total granule weight. Preferably, the acid, base or buffer is present in an amount sufficient to give a solution pH of about 5 to about 11 when the granules are dissolved in water. Several processes for preparing these compositions are still further provided herein.

BRIEF DESCRIPTION OF THE DRAWINGS

The accompanying drawings are to be read in conjunction with the Detailed Description below.

DETAILED DESCRIPTION OF THE PREFERRED EMBODIMENTS

We have now discovered that water-in-oil emulsions and microemulsions of functionalized water-soluble polymers can be spray dried under certain conditions so as to produce substantially dry polymer products which flow freely and dissolve rapidly. We have also now discovered that water-in-oil emulsions and microemulsions of thermosensitive functionalized water-soluble polymers can be spray dried under certain conditions so as to produce substantially dry polymer products which flow freely and dissolve rapidly. In particular, Mannich polyacrylamide, quaternized Mannich polyacrylamide and glyoxal polyacrylamide microemulsions can be spray dried by our process to produce compositions which are more table than the corresponding polymer microemulsions. Our process is also applicable to water-in-oil emulsions of functionalized water-soluble polymers that are not particularly thermosensitive, as well as to blends of water-soluble vinyl addition polymer emulsions and functionalized water-soluble polymer microemulsions.

Spray drying processes are generally known in the art. The term "spray drying" as used herein refers to the term as it is commonly known and used in the art, for example see the description in Kirk-Othmer Encyclopedia of Chemical Technology, Fourth Edition, Volume 8, pp. 505–508 which is incorporated herein by reference. Further details are disclosed in the Spray Drying Handbook by K. Masters, copublished by Longman Scientific and John Wiley and Sons, Fifth Edition, 1991, which is also incorporated herein by reference. During the spray drying process, the polymer emulsion or microemulsion is sprayed by a suitable atomizer into a large chamber through which a hot gas is blown, thereby removing most or all of the volatiles and enabling the recovery of the dried polymer. Multiple atomizers and types of atomizers, such as two-fluid pneumatic nozzles, single fluid pressure nozzles, rotary atomizers, etc. may be utilized. The size and shape of the chamber is generally chosen to reflect the type and number of atomizers used. The dried polymer may be collected at the base of the dryer by various means such as a simple outlet, classifying cone, bag filter, etc., or the polymer may be subjected to further stages of drying, such as by fluid beds, or agglomeration. Gas flow may be cocurrent, countercurrent or mixed flow. The volatiles may be vented to the atmosphere or collected.

There are four interrelated operating parameters in our process: gas inlet temperature, gas outlet temperature, product volatiles and residence time in the dryer. The outlet temperature generally should be below 100° C., preferably below 95° C. and more preferably below 85° C. At temperatures above about 100° C. there is significant product degradation. Preferably, the outlet temperature is greater than about 70° C. more preferably greater than about 75° C. Outlet temperatures below about 70° C. may be suitable in certain instances, though generally this is less preferred. For instance, at the cost of efficiency, spray drying could be carried out at long residence times, high gas flow rates and low outlet temperatures. Generally, the dryer should be operated at the lowest possible outlet temperature consistent with obtaining a satisfactory product. To facilitate operating at the lowest possible operating temperature, a volatile liquid hydrocarbon or oil is generally used in the polymer emulsion or microemulsion. "Volatile", for purposes of this invention, means that the boiling point or upper end of the boiling point range of the hydrocarbon liquid is below about 200° C., preferably below about 190° C. and most preferably below about 180° C. The use of a volatile liquid hydrocarbon allows for spray drying of the emulsion or microemulsion to be carried out at low outlet temperatures so that polymer degradation is avoided or substantially reduced. Although in theory a hydrocarbon liquid with a very low boiling point, say room temperature or below, would be most preferable to avoid product degradation, in practice hydrocarbon liquids with low boiling points in this range may, under some circumstances, be unacceptable for other reasons related to handling and flammability. Thus, hydrocarbon liquids having a boiling point within the range from about 70° C. to 190° C., preferably from about 160° C. to about 180° C. are used. Suitable hydrocarbon liquids useful herein include any organic hydrocarbon liquids such as aliphatic hydrocarbons, aromatic hydrocarbons, mixtures of aromatic and aliphatic hydrocarbons, etc. usually containing about 6 to about 12 carbon atoms. Preferred examples of suitable hydrocarbons include benzene, xylene, toluene, mineral oil fractions, kerosenes, naphthas, petroleum fractions and the like. A most preferred hydrocarbon is a material called Isopar G manufactured by Exxon Chemical. Isopar G is a mixture of synthetic isoparaffinic hydrocarbons having a boiling point range of about 160° C. to about 177° C.

The inlet temperature, the feed rate, and the composition of the polymer emulsion may all affect outlet temperatures. These parameters may be varied to provide a desired outlet temperature. Feed rates are not critical, and generally will vary depending on the size of the dryer and the gas flow rate.

Inlet gas temperature is less critical than outlet gas temperature, and is generally above about 140° C., preferably above about 160° C. The inlet gas temperature is preferably below about 200° C. and more preferably below about 180° C. Thus, preferred inlet gas temperature ranges from about 140° C. to about 200° C., more preferably from about 160° C. to about 180° C. Proper inlet gas temperatures tend to avoid product degradation on the high side and to avoid inadequate drying on the low side. Suitable gases used as the inlet gas are gases known to those skilled in the art, including air, nitrogen, and other gases which will not cause undesirable polymer degradation or contamination.

Residence time is generally at least about 8 seconds, preferably at least about 10 seconds. Residence time is generally no more than about 120 seconds, preferably no more than about 60 seconds, and most preferably no more than about 30 seconds. Therefore, the general range of residence time is about 8 to about 120 seconds, preferably about 10 to about 60 seconds, and most preferably about 10 to about 30 seconds. Residence time is a nominal value obtained by dividing the volume of the dryer by the volumetric gas flow. It is known to those skilled in the art that longer residence times are to be expected when larger dryers are used or when the dryer is run in a less efficient manner. For instance, at the cost of efficiency, longer residence times would be expected at very low inlet temperatures and slow gas flow rates. As a practical matter, the residence times useful in the present invention may vary from the values described above, depending on the size and type of spray dryer used, the efficiency at which it is operated, and other operational parameters. Thus, residence times specified herein may be modified to accommodate dryer conditions using common knowledge of those skilled in the art.

Under the conditions of drying set forth herein, the granular polymers produced by the processes described herein are substantially dry. As used to describe the granular polymers produced herein, "substantially dry" means that the polymer contains less than about 12% volatiles, by weight, based on the weight of the spray dried polymer. The polymer generally contains more than about 5% volatiles, by weight, and preferably contains from about 8% to about 10% volatiles by weight, same basis. The volatiles are measured by determining the weight loss on drying the polymer product at about 105° C. for about 30 minutes. The optimum standard viscosity for a particular polymer is very dependent on the application e.g. flocculation of suspended solids, paper making, oil recovery, mining, etc. For instance, for many flocculant applications, Mannich polyacrylamide and quaternized derivatives thereof have a standard viscosity greater than about 1.5 centipoise and preferably greater than about 2.0 centipoise. The standard viscosities are generally less than about 6.0 centipoise and preferably less than about 5.0 centipoise. However, applications other than flocculation may require polymers with standard viscosities higher or lower than those given above. One advantage of the instant invention is that the standard viscosity of the granular polymers produced according to the processes described herein is within 15% of the standard viscosity of the corresponding polymer emulsion or microemulsion. This indicates that the polymers are not substantially altered by the spray-drying process.

The optimum molecular weight or molecular weight range for a particular polymer is also very dependent on the application e.g. flocculation of suspended solids, paper making, oil recovery, mining, etc. For instance, for many flocculant applications, Mannich polyacrylamide and quaternized derivatives thereof have a molecular weight greater than about 100,000 and preferably greater than about 1,000,000. However, applications other than flocculation may require polymers with molecular weights higher or lower than those given above. The water-soluble polymers produced by the processes described herein may contain small amounts of insoluble polymer. Such small amounts of insoluble polymer do not generally affect the performance of the polymer in, for instance, the applications mentioned above. In some cases, polymers which do not dissolve, i.e. water-swellable polymers are desired for applications such as fluid thickening.

The polymer granules produced herein typically range in size from about 10 microns to about 400 microns, with a large fraction between 50 and 300 microns. Agglomerates may range up to 1000 microns or occasionally even higher. The size of the granules can be varied somewhat by altering the operational parameters e.g. spray configuration, emulsion viscosity, etc.

The means for spraying the emulsion or microemulsion into the gas stream are not particularly critical and any known spray-drying apparatus may be used. For instance, means that are well known in the art such as pressure nozzles, two-fluid nozzles, and spinning disk or rotary atomizers can all be used to spray dry the emulsion or microemulsion into the gas stream. Gas flow may be cocurrent, countercurrent or mixed flow, cocurrent flow being preferred. The means for collecting the dry polymer product is also not critical. The spray drying process may by followed by fluid beds for second stage drying or fines agglomeration. Likewise, a simple outlet, agglomeration chamber, classifying cone, bag filter, etc. and the like may be utilized to collect or further process the substantially dry polymer that is produced by the practice of our invention.

Mannich acrylamide polymers are preferably prepared in a microemulsion using processes known in the art. Mannich acrylamide polymers may also be prepared by emulsion polymerization according to processes known in the art, though this may be less preferred. In U.S. Pat. Nos. 4,956,399; 4,956,400; 5,037,881; and 5,132,023; which are incorporated herein by reference, means for preparing functionalized water-soluble polymer-containing microemulsions are given. Specific examples of functionalized water-soluble polymers include, but are not limited to, poly(alk) acrylamide polymers polymerized in a water-in-oil microemulsion and functionalized with at least about 1 mole % tertiary aminomethyl groups to give Mannich poly(alk) acrylamide polymers and the quaternized derivatives thereof, poly(alk)acrylamide polymers polymerized in a water-in-oil emulsion or microemulsion and functionalized with at least about 1 mole % glyoxal groups to give glyoxal poly(alk)acrylamide polymers, poly(alk)acrylamide polymers polymerized in a water-in-oil emulsion or microemulsion and functionalized with at least about 1 mole % glyoxylic groups to give glyoxylic poly(alk)acrylamide, copolymers thereof, and the like. The mannich and glyoxal acrylamide polymers used in the instant invention may be water-swellable, but are preferably water-soluble.

For example, functionalized water-soluble polymers such as Mannich poly(alk)acrylamide and quaternized derivatives thereof are prepared in a microemulsion by (i) preparing a monomer microemulsion by mixing an aqueous monomer solution of (alk)acrylamide with a volatile hydrocarbon liquid or oil containing an appropriate surfactant or emulsifier to form an inverse microemulsion consisting of small aqueous monomer droplets dispersed in the continuous oil phase, (ii) subjecting the (alk)acrylamide microemulsion to free radical polymerization to form a poly(alk)acrylamide-containing microemulsion, (iii) functionalizing the poly(alk) acrylamide backbone by reaction with formaldehyde and a secondary amine or a complex thereof to form a Mannich poly(alk)acrylamide, and (iv) optionally, quaternizing the resultant polymer to form a quaternized Mannich poly(alk) acrylamide. Glyoxal poly(alk)acrylamide-containing microemulsions are prepared similarly, except that the poly(alk) acrylamide backbone is allowed to react with glyoxal to form glyoxal poly(alk)acrylamides.

Broad variations in the polymerization conditions are possible, while still obtaining a water-soluble polymer-containing miocroemulsion that may be spray dried by the process of the instant invention. For instance, the (alk) acrylamide can be copolymerized with nonionic, cationic or anionic monomers to form a copolymer backbone. One or more emulsifiers or surfactants can generally be employed to form the microemulsion, usually the aforesaid have an HLB (Hydrophilic Lipophilic Balance) in the range of about 8 to about 12. A sufficient amount of the emulsifier or surfactant is used such that a microemulsion is formed. The ratio by weight of the amounts of aqueous phase and hydrocarbon phases is usually chosen as high as possible, so as to obtain, after polymerization, a microemulsion of high polymer content. Practically, this ratio may range, for example from about 0.5:1 to about 3:1, and usually approximates 1:1. The polymer solids are usually greater than 10%, by weight, and preferably greater than 20%, by weight.

The aqueous monomer solution may contain such conventional additives as are desired. For example, the solution may contain chelating agents to remove polymerization inhibitors, chain transfer agents, pH adjusters, initiators and other conventional additives. Polymerization of the microemulsion may be carried out in any manner known to those skilled in the art.

Initiation may be effected with a variety of thermal and redox free radical initiators, including peroxides, e.g. t-butyl peroxide; azo compounds, e.g. azobisisobutyronitrile; inorganic compounds, such as potassium persulfate and redox couples, such as ferrous ammonium sulfate/ammonium persulfate. A preferred initiator is sodium bromate/sulfur dioxide. Initiator addition may be effected any time prior to the actual polymerization per se. Polymerization may also be effected by photochemical irradiation processes, such as ultraviolet irradiation or by ionizing irradiation from a cobalt 60 source.

In the case of the Mannich poly(alk)acrylamide microemulsions, the ratio of formaldehyde to amine ranges from about 10:1 to 1:10, by mole, respectively. It is generally preferred to use a ratio as close to 1:1 as practical. A sufficient quantity of the amine and formaldehyde or complex thereof is required to impart at least 1 mole percent of the tertiary aminomethyl groups to the acrylamide backbone polymer. Formaldehydes useful in the practice of this invention may be formaldehyde, paraformaldehyde, trioxane, aqueous formalin, etc. Useful secondary amines are dimethylamines, methylethylamine, diethylamine, amylmethylamine, dibutylamine, ethanolmethylamine, diethanolamine, or mixtures thereof. Especially preferred is a process wherein the formaldehyde comprises formalin and the secondary amine comprises dimethylamine. It is also contemplated to employ a formaldehyde-secondary amine complex such as N,N-dimethylaminomethanol.

In the case of the quaternized Mannich poly(alk) acrylamide microemulsions, quaternization may be carried out by reacting the Mannich poly(alk)acrylamide with one or more quaternizing agents known to those skilled in the art e.g. methyl chloride, methyl bromide, ethyl chloride, ethyl bromide, dimethyl sulfate, diethyl sulfate, benzyl chloride, etc. and the like. Methyl chloride is preferred. Some or substantially all of the tertiary aminomethyl groups in the polymer may be quaternized. Mannich polyacrylamide and quaternary Mannich polyacrylamide microemulsions may be heat treated prior to spray drying according to methods described in U.S. Pat. No. 5,627,260 filed Feb. 12, 1993, which is hereby incorporated herein by reference.

The process of the instant invention is particularly well-suited for spray drying polymer emulsions and microemulsions that contain polymers that may degrade at high temperatures, e.g. thermosensitive polymers. Blends comprised of a water-soluble polymer-containing emulsion or microemulsion with a thermosensitive water-soluble polymer-containing emulsion or microemulsion may also be spray dried by the process of the instant invention, provided that the blend also comprises a volatile hydrocarbon liquid. Thus, the blend may contain a water-soluble polymer-containing emulsion wherein the polymer contained in the emulsion is not particularly thermosensitive. The water-soluble polymer contained in the emulsion may be a vinyl addition polymer formed from nonionic, cationic, or anionic monomers or mixtures thereof. Preferably, the vinyl addition polymer is cationic. For instance, blends containing emulsion polymers and copolymers produced from water-soluble vinyl-addition monomers, such as acrylamide, and those produced from comonomer mixtures of acrylamide and its water-soluble comonomers including sodium acrylate, acrylic acid, vinyl benzyl trimethylammonium chloride, methacrylic acid, acrylonitrile, dialkylaminoalkyl(alk) acrylate and its quaternary salts, including dimethylaminoethyl(meth)acrylate and its quaternary salts, (meth)acrylamidoproplytrimethylammonium chloride, and the like, may be spray dried according to the instant invention.

In general, blends comprised of a water-soluble polymer-containing emulsion or microemulsion with a thermosensitive water-soluble polymer-containing emulsion or microemulsion prepared according to Ser. No. 08/157,764 now abandoned, and Ser. No. 08/157,795, now abandoned filed on Nov. 24, 1993, the disclosures of which are hereby incorporated herein by reference, may be spray dried according to the process of the instant invention, provided that the blends comprise a volatile hydrocarbon liquid. In particular, the process described herein may be utilized to spray dry blends of microemulsions and water-soluble vinyl-addition polymer-containing emulsions. In a preferred embodiment, the water-soluble vinyl-addition polymer is an acrylamide/acryloxyethyltrimethylammonium chloride copolymer. In a most preferred embodiment, a blend of a quaternized Mannich poly(alk)acrylamide-containing water-in-oil microemulsion and an acrylamide/acryloxyethyltrimethylammonium chloride copolymer-containing emulsion, wherein said blend comprises Isopar G, is spray dried by the process described herein.

In another preferred embodiment of the present invention, a microemulsion comprising a dialkyl aminomethylated (Mannich) (alk)acrylamide or quaternized derivative thereof is prepared for blending with a second emulsion comprising any water-swellable or water-soluble polymer. The Mannich (alk)acrylamide is preferably an acrylamide polymer substituted with at least about I mole percent of tertiary aminomethyl groups and more preferably a quaternary derivative. In the second emulsion, which is preferably a macroemulsion, it is preferable to use a cationic polymer and more preferably an (alk)acrylamide-based cationic polymer including, but not limited to, cationic polymers containing monomeric units selected from quaternary dialkyl aminomethyl (alk)acrylamide; dialkyl aminomethyl (alk)acrylamide quaternary dialkylaminoalkyl (meth)acrylamides; dialkyl aminoalkyl (meth)acrylamides and copolymers thereof with acrylamide or (meth)acrylamide with a monomer selected from quaternary dialkylaminoalkyl (meth)acrylates dialkylaminoalkyl (meth)acrylates and diallyldialkylammonium halides. Among these, copolymers of acrylamide with quaternary dialkylaminoalkyl (meth)acrylates are particularly preferred and copolymers of acrylamide and methacryloyloxyethyltrimethylammonium salt (including halides and sulfites) are most preferred, particularly those having a 1 to 60 mole percent cationic functionality, based on the monomer, more preferably 1–20 mole percent. Optionally, a difunctional monomer such as methylene bisacrylamide or the like may be incorporated into the monomer solution prior to polymerization. Any cationic polymer containing about 1–60 mole percent, most preferably 1–20 mole percent cationic functionality, based on monomer, may be employed in the second emulsion. Microemulsions containing a cationic polymer preferably a quaternized or tertiary Mannich PAM, more preferably those polymers containing from about to about 100 mole percent cationic functionality, based on the monomer, more preferably from about 60 to about 90 mole percent cationic functionality, may be combined with the second emulsions comprising any water-swellable or water-soluble polymer including the preferred cationic (alk)acrylamide-based polymers described above. While it is most preferred to include a quaternary Mannich (alk)acrylamide polymer in the microemulsion, the unquaternized Mannich acrylamide polymer is also contemplated within the scope of this preferred embodiment.

All emulsions and microemulsions described herein are inverse or water-in-oil. An emulsion, for purposes of this invention, is generally defined as a composition comprising two liquids or phases which are insoluble in each other along with a surfactant, surfactant mixture or emulsifier. A microemulsion, for purposes of this invention, is generally defined as a thermodynamically stable composition comprising two liquids or phases which are insoluble in each other along with a surfactant, surfactant mixture or emulsifier. Polymeric inverse microemulsions which contain a continuous oil phase and a polymer-containing discontinuous phase (usually aqueous) are prepared from thermodynamically stable monomer microemulsions. Inverse microemulsions have a narrow droplet size distribution and are usually, but not always, optically transparent. The discontinuous polymer-containing phase of a microemulsion forms droplets or micelles, which are usually aqueous and usually have a volume average droplet diameter which is less than about 2500 Å, preferably less than about 2000 Å, and most preferably less than about 1000 Å. Some microemulsions may have a volume average droplet diameter as large as about 3000 Å.

Additional materials such as flow control agents, dust control agents, pH adjusting agents, surfactant, emulsifier, etc. and the like may be added to the emulsion or microemulsion before or during the spray drying process, or to the polymer granules after the spray drying process, or both, to enhance the production, distribution, packaging, handling, performance, etc. and the like of the polymer granules.

The spray dry recovery processes described herein are particularly advantageous when the water-soluble polymer in the emulsion or microemulsion is functionalized and most particularly when the polymer is thermosensitive and has been functionalized. "Thermosensitive" polymers, as the term is used herein, are polymers whose properties change relatively quickly, i.e. within a few months, at about ambient temperature or above. The types of properties which change include dilute solution viscosity, ability to flocculate suspended solids, ability to recover ore from slurries, ability to aid in paper making process, etc. For examples, a thermosensitive polymer is one which, after about 6 months storage at room temperature, exhibits a standard viscosity that is about 15% or more lower than its initial standard viscosity, as measured and described in the Examples herein. The changes may be due to crosslinking. Although some crosslinking may be acceptable and occasionally even desirable, extensive crosslinking tends to reduce the effectiveness of the polymer in the applications mentioned above and, in extreme cases, may render the polymer insoluble.

Generally, Mannich polyacrylamide, quaternized Mannich polyacrylamide and glyoxal polyacrylamide polymers made by emulsion or microemulsion polymerizations tend to be thermosensitive. Examples of functionalized water-soluble polymers which may be thermosensitive include, but are not limited to, poly(alk)acrylamide polymers polymerized in a water-in-oil microemulsion and functionalized with at least about 1 mole % tertiary aminomethyl groups to give Mannich poly(alk)acrylamide polymers (which may be further functionalized by quaternization with methyl chloride or dimethyl sulfate), poly(alk)acrylamide polymers polymerized in a water-in-oil emulsion or microemulsion and functionalized with at least about 1 mole % glyoxal groups to give glyoxal poly(alk)acrylamide polymers, poly(alk)acrylamide polymers polymerized in a water-in-oil emulsion or microemulsion and functionalized with at least about 1 mole % glyoxylic groups to give glyoxylic poly(alk)acrylamide, copolymers thereof, and the like.

Figure 1:
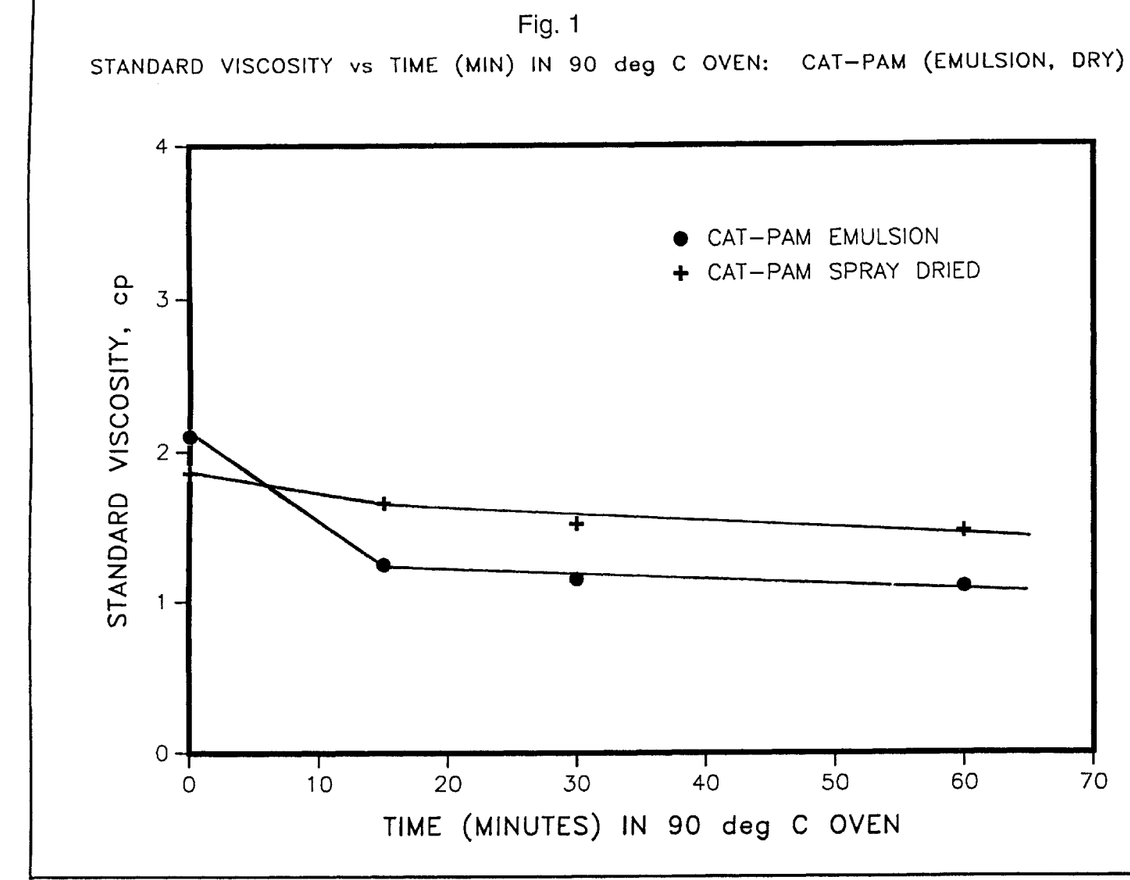
FIG. 1 is a plot of the standard viscosity of cationic polyacrylamides, prepared as described in Example 1, as a function of time in an oven at 90° C. One set of data is for the microemulsion form of the polymer, and the other is for the spray dried form of the same polymer.
Figure 2:
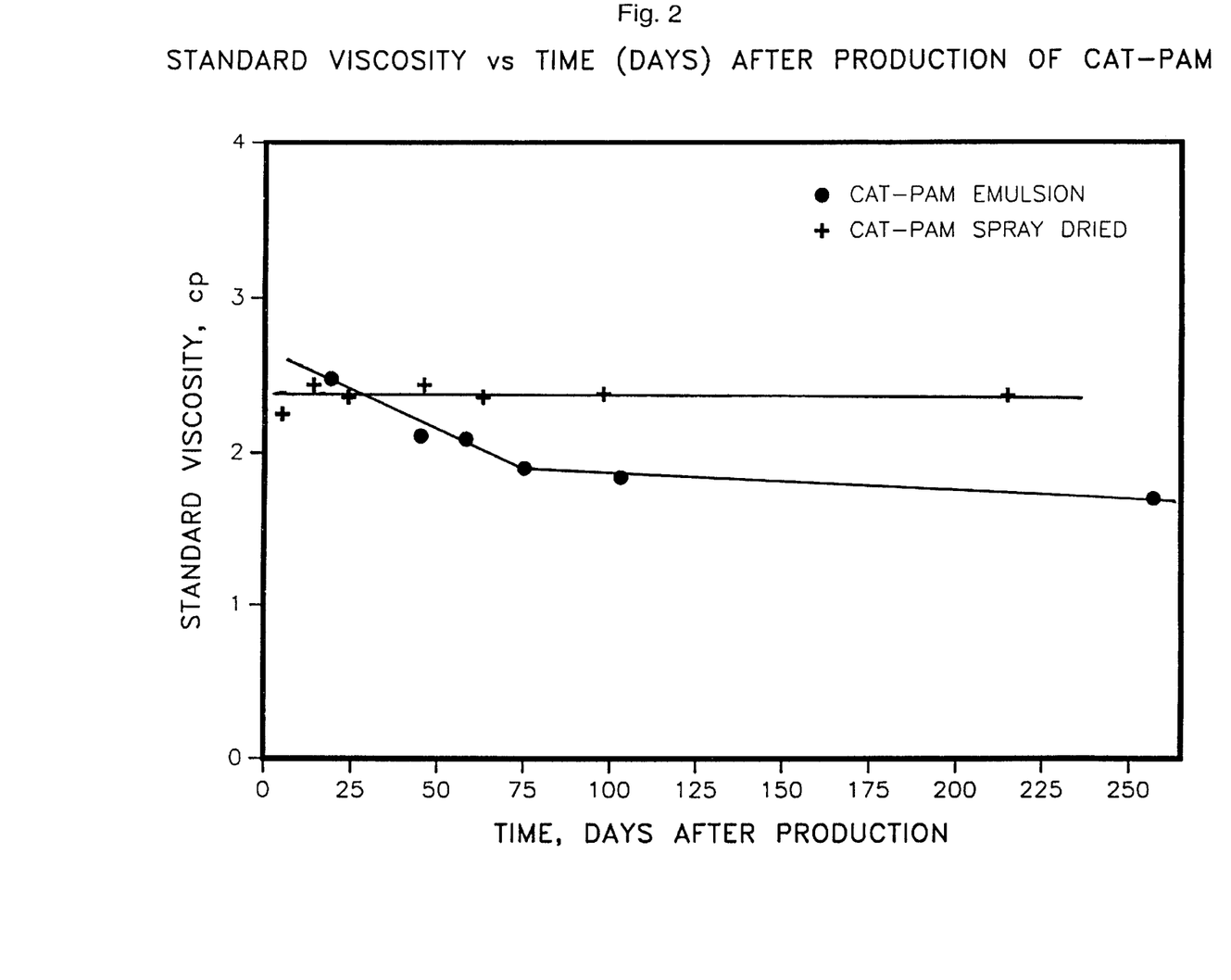
FIG. 2 is a plot of the standard viscosity of cationic polyacrylamides, prepared as described in Example 1, as a function of time at ambient temperature. One set of data is for the microemulsion form of the polymer, and the other is for the spray dried form of the same polymer.

The free flowing, substantially dry water-soluble Mannich poly(alk)acrylamide and quaternized Mannich poly(alk)acrylamide granules of the present invention generally exhibit improved stability relative to the microemulsion from which they were derived. FIG. 1 shows the change in standard viscosity as a function of time at 90° C. for spray dried quaternized Mannich polyacrylamide, compared to a quaternized Mannich polyacrylamide microemulsion from which the spray dried polymer was derived. The standard viscosity of the microemulsion polymer changed substantially as a function of time, whereas the change in standard viscosity for the spray dried polymer was insubstantial. FIGS. 2 is a similar plot of data obtained in a similar manner, except that the dry polymer and the microemulsion polymer were stored at ambient temperature. Once again, the standard viscosity of the microemulsion polymer changed substantially as a function of time, whereas the change in standard viscosity for the spray dried polymer was not substantial. In both cases, at room temperature and at 90° C., it is quite surprising that the spray dried polymer shows greater stability, as measured by standard viscosity, than the corresponding polymer contained in the microemulsion.

Surprisingly, the standard viscosities of the free flowing, substantially dry, water-soluble polymer granules that are the product of the process described herein are not substantially reduced by the spray drying process of the invention, even when the polymers are known to be thermosensitive. The standard viscosity values of the polymer granules are not decreased by greater than 15% of their initial value as a result of the spray drying process, even though the standard viscosity of the thermosensitive water-soluble polymer in the polymer-containing water-in-oil microemulsions is known to decrease quickly at elevated temperatures as described hereinabove. It is also surprising that the short residence times result in free-flowing, finely divided polymer products with low volatile levels. Moreover, the residual levels of hydrocarbon liquids in the finely divided polymer granules are very low, typically less than 1.0% by weight, based on the total weight of the granules, and preferably, less than 0.2% by weight, same basis.

It is still further surprising that the Mannich and quaternary Mannich polymer granules have, in some cases, substantially reduced residual contamination by certain chemical reagents added during the functionalization step e.g. formaldehyde, methyl chloride and amines. Typically, the residual level of methyl chloride in the granules is below 500 parts per million parts (ppm), based on the total weight of the granules, and preferably below 100 ppm, same basis. Formaldehyde is typically below 2000 ppm and preferably below 1000 ppm, same basis. Individual residual amines, which may be present as their hydrochloride salts, are typically present at below 20,000 ppm and preferably below 10,000 ppm, same basis.

After recovery of the spray dried polymer from the hot gas stream, the gas, which may contain the volatile hydrocarbon liquid and the water used to make the emulsion, may be vented. However, venting may be undesirable for economic and environmental reasons. Preferably, the hydrocarbon liquid is recovered from the spray drying process and recycled for use in other processes e.g. polymerizations. As used herein, "recovery" of the hydrocarbon liquid means that all or substantially all of the hydrocarbon liquid is not vented, but is captured in liquid form, and "recycled" means that the recovered hydrocarbon liquid is reused for another process, preferably a polymerization process such as those used to produce polymer emulsions and microemulsions for spray drying, most preferably for producing Mannich polymer emulsions and microemulsions. In the instant invention, it has been discovered that the hydrocarbon liquid recovered from the spray drying process can be recycled because it is substantially free of certain chemical reagents added during the functionalization step, which tend to reduce the stability of the polymer. In particular, the presence of formaldehyde in the recovered hydrocarbon liquid is very much reduced. Any means known in the art for recovering liquids from a gas stream is suitable for recovering the hydrocarbon liquid. For instance, the hydrocarbon liquid may be recovered by passing the outlet gas from the spray dryer through a condenser, preferably a direct contact condenser, and separating the oil and water layers. Preferably, all or nearly all of the dry polymer has been removed from the outlet gas by a bag filter, cyclone or similar means before the outlet gas reaches the condenser. After separating the oil and water layers, the oil may be recycled, preferably without any further purification, back to a polymerization reactor for use in another polymerization or for other uses. The water layer appears to contain substantially all of the formaldehyde.

The level of formaldehyde in the recovered hydrocarbon liquid from a quaternized Mannich poly(alk)acrylamide microemulsion is less than one hundred milligrams formaldehyde per kilogram of recovered hydrocarbon liquid, preferably less than ten milligrams formaldehyde per kilogram of recovered hydrocarbon liquid, and most preferably less than one milligram formaldehyde per kilogram of recovered hydrocarbon liquid. Formaldehyde may be detrimental to certain types of polymerization processes, so that a very much reduced level of formaldehyde in the recovered oil is a substantial advantage. It is economically and environmentally advantageous to recycle the oil for use in other processes, including the same or other polymerization processes. The lack of hydrocarbon liquids and certain residual chemical reagents from the post-reaction step, in particular formaldehyde, in the finely divided polymer products are also substantial environmental advantages.

The free flowing, substantially dry, water-soluble polymer granules that are the product of the invention described herein may be used in any applications, e.g. flocculants for mining operations to recover ore from slurries, water treating to remove suspended impurities etc., in paper making to aid paper formation and in oil recovery industries. The polymers of the present invention can conveniently be employed as flocculants in the form of dilute aqueous solutions. These solutions can be prepared by dispersing and dissolving the granules in water. Concentrating dispersions of suspended solids is carried out by adding an effective amount of the dilute aqueous solution to the suspension to produce an effluent of desired characteristics.

The polymer products of this invention are useful in a wide range of solid-liquid separations. These polymers may be used in the dewatering of biologically treated suspensions, such as sewage or other municipal and industrial sludges, the drainage of cellulosic suspension such as those found in paper production, e.g. paper waste, and the settlement of various organic or inorganic suspensions, i.e. refinery waste, food waste, etc.

When the granules are produced in such a way that they do not dissolve fully in water, but are instead water-swellable, they may be dispersed in water in the same manner as the water-soluble granules are dispersed. Water-swellable polymers may be useful for applications such as thickening paint and printing inks.

We have also discovered that mixing, in any order, an acid, base or buffer with the substantially dry water-soluble polymer granules that are the product of the spray drying process described hereinabove, is particularly advantageous. A buffer, for the purposes of this invention, is a substance or blend of substances that, when dissolved in water, gives a solution that resists changes in pH when small amounts of acid or base are added. Preferably, a buffer contains an acid and a base. For example, any solution of a weak acid plus a salt of that acid is a buffer solution. A base, for the purposes of this invention, is a substance or blend of substances that, when dissolved in pure water, gives a solution with a pH value greater than 7. An acid, for the purposes of this invention, is a substance or blend of substances that, when dissolved in pure water, gives a solution with a pH value less than 7. The addition of an acid, base or buffer to the polymer granules enhances the flow properties of the dry polymer and adjusts the pH of the solution that the polymer granules are dissolved into so as to enhance the rate of dissolution and performance of the polymer granules in the desired application. Bases are preferred and buffers are most preferred. Acids, bases and buffers useful in the instant invention may be solid or liquid, though it is especially preferred to use an acid, base, or buffer that is substantially dry so as to avoid clumping. Substantially dry, when used to describe the acid, base, or buffer for the purposes of this invention, means that the powdered acid, base, or buffer flows freely. The acid, base, or buffer may be hydrated as long as it flows freely.

Any base known in the art may be used. Suitable powdered bases may include the alkali and alkaline earth metal salts of carbonate, bicarbonate, citrate, phosphate and acetate. Preferred bases may include sodium carbonate, sodium bicarbonate, potassium carbonate, potassium bicarbonate, sodium acetate, potassium acetate, sodium citrate, potassium citrate, sodium phosphate, potassium phosphate, etc. and the like. Sodium carbonate and sodium bicarbonate are more preferred, and sodium bicarbonate is most preferred. The mixture of the base and the polymer granules is such that the base may be incorporated into the interior of the granules, or may coat the surface of the granules, or may be distinct from the granules, or any combination thereof.

Any buffer known in the art may be used. Suitable buffers may comprise the alkali and alkaline earth metal salts of carbonate, bicarbonate, citrate, phosphate and acetate, with the corresponding acid. The mixture of the buffer and the polymer granules is such that the base may be incorporated into the interior of the granules, or may coat the surface of the granules, or may be distinct from the granules, or any combination thereof. The buffer system $KH_2PO_4/Na_2HPO_4$ or hydrates thereof is most preferred.

Any acid known in the art may be used. Suitable acids may comprise inorganic acids e.g. hydrochloric acid, nitrous acid, nitric acid, carbonic acid, phosphoric acid, phosphorus acid, sulfurous acid, and sulfuric acid, as well as organic acids e.g. acetic acid, lactic acid, citric acid, formic acid, alkylsulfonic acids, etc. and the like. Acids such as $KH_2PO_4$, $NaH_2PO_4$ and hydrates thereof are preferred. In instances where a quaternary mannich polyacrylamide microemulsion is heat treated by, for example, adjusting the pH to about 3.6 to about 4.8 adding formaldehyde scavenger, adjusting the water content to about 10–45 weight percent of polymer and heating the resultant emulsion at from about 40° C. to about 80° C. for about 3 to about 20 hours, the acid is preferably added in addition to and after the heat treating step.

It is preferred to add the acid, base or buffer directly to the polymer granules. Alternatively, and less preferably, an acid, base or buffer may be dissolved in water or oil to form a solution or slurry and added to the water-soluble polymer-containing emulsion or microemulsion before spray drying. The solution or slurry of the acid, base or buffer may be spray dried simultaneously or substantially simultaneously with the spray drying of the emulsion or microemulsion, or the acid, base, or buffer may be added directly to the spray dryer while simultaneously or substantially simultaneously spray drying the emulsion or microemulsion, to form polymer granules which comprise the acid, base, or buffer. In this case, the acid, base, or buffer need not be substantially dry. Another, also less preferred, way to add one or more acids, bases, or buffers to the polymer is to add part of the acid, base, or buffer before or during the spray dry process, and part of the acid, base, or buffer, or perhaps a different acid, base, or buffer, to the resulting polymer granules. The buffer may be formed when a base is added to an emulsion, microemulsion or granule which already contains the corresponding acid, or the buffer may be formed when an acid is added to an emulsion, microemulsion or granule that already contains the corresponding base.

The amount of acid, base or buffer to be added to the water-soluble polymer granules and compositions comprising such granules of the present invention is preferably an amount sufficient to provide a solution pH of from about 5 to about 11, preferably from about 5.5 to about 9 and most preferably about 6 to about 8, when the granules or granule compositions are dissolved in water. Regardless of the manner in which acid, base or buffer is added (i.e., whether added to the emulsion prior to or during spray drying or to the granules after spray drying) the amount should be such that the resulting solution containing dissolved polymer granules has a pH at least about 5, preferably at least about 6 and below about 11, preferably a pH below about 8.

It is understood that the pH of the resulting solution will depend on the pH of the water before the polymer granules are added. For instance, in order to produce a preferred pH in the resulting solution in the range of about 5 to about 9, more base should generally be present in the granules if the water is more acidic than if the water is less acidic. It is likewise understood that the preferred amount of base present in the polymer granules may depend on the pH of the water into which the polymer granules are to be dissolved. For example, for many waters of moderate acidity, the polymer granules should contain about 0.1% to about 3.5%, based on total weight, of a preferred base such as sodium bicarbonate. Generally, the polymer granules may contain base in an amount of at least about 0.05% by weight, preferably at least about 0.1% and generally up to about 10.0% preferably up to about 20.0% by weight based on total granule weight. More preferably the amount of base ranges from about 0.05% to about 5.0%, based on total weight of granules. The aforesaid amounts also apply to acids. Similar reasoning is understood concerning the optimum amount of acid; i.e. the presence of more acid will be preferred in the granules when the water is more basic than when the water is less basic in order for the solution of the polymer to have the desired pH.

Routine experimentation by one skilled in the art may be used to determine the appropriate amount of acid, base or buffer from a particular water.

Likewise, the amount of buffer will also depend on the pH of the water before the polymer granules are added. The amount of buffer present will tend to affect the ability of the polymer solution to resist changes in pH. For instance, for a preferred buffer system such as $KH_2PO_4/Na_2HPO_4 \cdot 12\, H_2O$, the buffer should be at least about 0.1%, by weight, and preferably at least about 5%, by weight, of the total weight of the granules. Although it would seem preferable to use as much buffer as possible so as to provide the polymer solution with the greatest ability to resist pH changes, it is also preferable for the polymer granules to contain as much polymer as possible. Thus, in practice, the buffer should comprise less than 50%, by weight, of the polymer granules, and preferably less than 30%, by weight, same basis. Therefore, the buffer should be present in the polymer granules at a level of at least about 0.05%, generally from about 0.1% to about 50%, by weight, and preferably about 5% to about 30%, by weight, based on the total granule weight. The exact amount of buffer depends on the pH of the water and how strongly the polymer solution needs to be able to resist changes in pH.

In addition to pH, another factor which tends to influence the rate of dissolution of the polymer granules and the performance of the polymer is the temperature of the polymer solution or the solution into which the polymer granules are dissolved. Therefore, the amount of acid, base, or buffer present in the polymer granules may vary depending on the temperature of the water that the polymer is to be dissolved into. For instance, quaternized Mannich polyacrylamide tends to dissolve more readily at higher temperatures, so that a lower pH, such as about 5, may be desired to dissolve the polymer when the temperature of the water is higher, such as about 35° C., whereas a pH of about 8 may be preferred if the water temperature is very low, such as about 5° C. It is apparent, therefore, from the foregoing that less base, or more acid, might be preferred at high temperatures than at low temperatures, and that the selection of buffer will also depend on the temperature.

The particle size of the acid, base, or buffer is not particularly important, and may be varied to optimize the flow properties of the mixture with the polymer granules. For instance, a preferred range of particle sizes for sodium bicarbonate is from about 10 to about 500 microns, more preferably about 50 to about 300 microns. The means for adding and mixing the substantially dry base to the polymer granules are likewise not critical. Any mechanical mixing means known to those skilled in the art for mixing granular solids is suitable.

The following examples are set forth for illustration purposes only and are not to be construed as limits on the present invention.

Polymer standard viscosity

Standard viscosity is the viscosity of a 0.096% solution of water-soluble polymer in 1 N sodium chloride at 25° C., at a pH of 8.0 for nonionic and anionic polymers and at a pH of 7.0 for cationic polymers, except where noted. The viscosity was measured by a Brookfield LVT viscometer with a UL adapter at 60 rpm. The polymer solution being measured was made by preparing a 0.20% solution of polymer in deionized water during two hours and then diluting with the appropriate amounts of deionized water and sodium chloride.

Dry Product Volatile Content

Volatiles content (% loss on drying; LOD) was determined using a Sartorius Model MA30 Moisture Analyzer. The dry polymer sample was dried at a specified temperature either to a constant weight or for a specified time. A period of 30 minutes at 105° C. provided a reliable and reproducible indicator of product volatiles content. The results are reported as weight percent volatiles based on the total weight.

Water analysis of the volatiles was performed by Karl Fisher titration. Residual oil levels in the dry products were determined by sample extraction with supercritical carbon dioxide and gas chromatography analysis of the extractant. Residual formaldehyde in the recovered hydrocarbon liquid was determined by stirring the recovered hydrocarbon liquid with water for thirty minutes, then analyzing the water extractant by ion chromatography.

EXAMPLE 1

A quaternized Mannich polyacrylamide microemulsion (Cat.PAM) was prepared as follows:

Preparation of polyacrylamide microemulsion: To 246.05 parts of polyoxyethylenesorbitol he polyoxyethylenesorbitol hepaoleate (PESH) and 13.9 parts sorbitol sesquioleate (SS), were slowly added 242.5 parts of a pH 3.0 aqueous solution containing acrylamide (109.8 parts), sodium bromate (0.0055 parts) and N-(2-hydroxyethyl) ethylenediaminetriacetic acid (0.10 parts) with stirring. The resulting monomer microemulsion was sparged for 40 minutes with nitrogen. $SO_2$ gas was then bubbled into the resultant microemulsion and the polymerization temperature was kept at 55° C. The $SO_2$ gas was prepared by passing nitrogen gas through a 0.5% sodium metabisulfite solution. The resulting product was a clear stable microemulsion having a standard viscosity of 3.5 centipoise.

Preparation of dimethylamine/formaldehyde adduct: Paraformaldehyde (92.4 parts, 95%) was slowly added to a suitable vessel containing dimethylamine (218.4 parts, 60.4% aqueous solution) while keeping the exotherm below 30° C. The resulting solution was allowed to cool with stirring and was then filtered yielding a clear solution. To 190.0 parts of this clear solution were added 15.04 parts of dicyanadiamide, 18.62 parts of sodium bisulfite, and 12.86 parts of deionized water. The solution was filtered yielding a clear solution.

Preparation of Mannich polyacrylamide: 150 parts of the polyacrylamide microemulsion were placed in a reaction vessel at ambient temperature. To this were slowly added 30 parts Isopar G, followed by 62.7 parts of the dimethylamine/formaldehyde adduct, with stirring, the dimethylamine/formaldehyde adduct being added over a 1.5 hour period while maintaining the temperature between 30–35° C., yielding a Mannich polyacrylamide microemulsion. The Mannich polyacrylamide microemulsion was stirred for an additional 5 hours at 30–35° C.

Preparation of quaternized Mannich polyacrylamide: 50 parts of the Mannich polyacrylamide microemulsion were placed in a pressure reactor mounted on a shaker. To this were added 4.5 parts of methyl chloride at ambient temperature over a period of approximately 10 hours, keeping the pressure of the reactor under 30 psi. The resulting product was a clear, stable, quaternized Mannich polyacrylamide microemulsion having a standard viscosity of about 2.5 centipoise.

EXAMPLE 2

A quaternized Mannich polyacrylamide microemulsion prepared as in Example 1 was spray dried in a 31-inch diameter portable spray dryer using a two-fluid nozzle in a nitrogen atmosphere with gas inlet and outlet temperatures of 182° C. and 92° C. respectively. The volatiles were 7.65% and the residence time was 14 seconds. The standard viscosity of a solution of the dry product was 2.25 cps, 9.3% less than the standard viscosity of a solution of the microemulsion product. The polymer granules ranged in size from 19 to 900 microns. The level of residuals in the dry product were as follows: formaldehyde: 520 ppm; methyl chloride: less than 100 ppm; dimethylamine hydrochloride: 3724 ppm; trimethylamine hydrochloride: 6248 ppm; tetramethylammonium hydrochloride: 5219 ppm.

COMPARATIVE EXAMPLE 3

The quaternized Mannich polyacrylamide microemulsion of Example 2 was dried on a 12-inch by 18-inch vacuum double drum dryer with less satisfactory results. The steam temperature on the drum was 115° C. and the steam pressure on the drums was 10 psig. The drum was operated at 6 revolutions per minute with a drum clearance of 0.010 inches and with a vacuum of about 65 mm Hg. The feed rate was about 90 pounds of emulsion per hour. The percent volatiles and standard viscosity are set forth in Table 1. A comparison of the dry polymer produced herein to that of Example 2 shows that the standard viscosity was significantly reduced using the drum dryer.

EXAMPLE

Quaternized Mannich polyacrylamide microemulsion prepared as in Example 1 were spray dried using an approximately eight-foot diameter spray dryer with a pressure nozzle atomizer. The dryer was operated as a closed cycle system using nitrogen gas. Product was collected at the base of the dryer or chamber. After recovering the polymer, the outlet gas was passed through a direct contact condenser and the resulting aqueous and Isopar G layers were separated. The cooled gas was then reheated and returned to the inlet of the dryer; a very small fraction was vented. The level of residual formaldehyde in the recovered Isopar G was 0.09 milligrams/kilogram, as measured after the completion of the five runs. The quality of the recovered Isopar G was such that it could be recycled and used directly for further microemulsion or emulsion polymerizations. Table 3 provides the various process conditions; the residence time for all runs was 24 seconds. The properties of the resulting dry polymer products are also shown in Table 3. One to three samples of the polymer product were collected for each run and analyzed as shown. In each case, the standard viscosity of the polymer granules was within 15% of the standard viscosity of the initial quaternized Mannich polyacrylamide microemulsion used to spray dry.

TABLE 1

| Ex. No. | Emulsion Name | Gas Inlet/Outlet Temperatute ° C. | Residence Time, sec. | Volatiles (LOD), % | Polymer Emulsion Standard Viscosity, cps | Dry Product Standard Viscosity, cps. | Change in Standard Viscosity, % |
|---|---|---|---|---|---|---|---|
| 2 | Cat.PAM | 182/92 | 14 | 7.65 | 2.48 | 2.25 | −9.3 |
| 3 | Cat.PAM (drum dried) | N/A | N/A | 9.9 | 2.48 | 1.98 | −20.2 |

EXAMPLES 4–8

A quaternized Mannich polyacrylamide microemulsion prepared as in Example 1 was spray dried using an approximately ten-foot diameter spray dryer with a rotary (spinning disk) atomizer. The dryer was operated using air on a once-through basis. The various temperatures and residence time conditions used are described in Table 2; residence time was 30 seconds for all of the runs. Product was collected both at the base of the dryer (chamber) and at the discharge of a cyclone located immediately after the dryer. Table 2 also shows the analytical results of Examples 4–8; in each case, polymer product from each of the two collection points (chamber and cyclone) was analyzed with the results as shown. In each case, the standard viscosity of the polymer granules was within 15% of the standard viscosity of the corresponding quaternized Mannich polyacrylamide microemulsion.

TABLE 2

| Ex. No. | Emulsion Name | Gas Inlet/Outlet Temperature ° C. | Atomizer Speed, rpm | Collection Point | Volatiles (LOD), % | Polymer Emulsion Standard Viscosity, cps | Dry Product Standard Viscosity, cps. | Change in Standard Viscosity, % |
|---|---|---|---|---|---|---|---|---|
| 4 | Cat.PAM | 138/86 | 19,500 | chamber | 8.59 | 2.44 | 2.45 | +0.4 |
|   |         |        |        | cyclone | 9.64 | 2.44 | 2.60 | +6.6 |
| 5 | Cat.PAM | 178/93 | 17,100 | chamber | 8.91 | 2.44 | 2.44 | 0 |
|   |         |        |        | cyclone | 9.71 | 2.44 | 2.59 | +6.2 |
| 6 | Cat.PAM | 181/92 | 15,800 | chamber | 8.40 | 2.44 | 2.40 | −1.6 |
|   |         |        |        | cyclone | 9.42 | 2.44 | 2.58 | +5.7 |
| 7 | Cat.PAM | 173/81 | 15,800 | chamber | 9.14 | 2.44 | 2.40 | −1.6 |
|   |         |        |        | cyclone | 10.93 | 2.44 | 2.58 | +5.7 |
| 8 | Cat.PAM | 171/81 | 13,400 | chamber | 10.34 | 2.44 | 2.38 | −2.5 |
|   |         |        |        | cyclone | 10.85 | 2.44 | 2.49 | +2.1 |

TABLE 3

| Ex. No. | Emulsion Name | Gas Inlet/Outlet Temperature °C. | Nozzle Orifice Size, mm | Sample # | Volatiles (LOD), % | Polymer Emulsion Standard Viscosity, cps | Dry Product Standard Viscosity, cps. | Change in Standard Viscosity, % |
|---|---|---|---|---|---|---|---|---|
| 9 | Cat.PAM | 177/86 | 1.4 | 1 | 9.70 | 2.49 | 2.36 | −5.2 |
|   |         |        |     | 2 | 9.64 | 2.49 | 2.16 | −13.3 |
| 10 | Cat.PAM | 183/90 | 1.3 | 1 | 11.76 | 2.49 | 2.57 | +3.2 |
|    |         |        |     | 2 | 11.67 | 2.49 | 2.48 | −0.4 |
|    |         |        |     | 3 | 10.28 | 2.49 | 2.46 | −1.2 |
| 11 | Cat.PAM | 184/91 | 1.3 | 1 | 8.12 | 2.49 | 2.20 | −11.7 |
| 12 | Cat.PAM | 145/91 | 0.8 | 1 | 9.15 | 2.49 | 2.21 | −11.2 |
|    |         |        |     | 2 | 9.57 | 2.49 | 2.42 | −2.8 |
| 13 | Cat.PAM | 164/93 | 1.04 | 1 | 6.80 | 2.49 | 2.32 | −6.8 |
|    |         |        |      | 2 | 8.53 | 2.49 | 2.30 | −7.6 |

EXAMPLE 14

A quaternized Mannich polyacrylamide microemulsion was prepared according to the procedure in Example 1, except that the polymer microemulsion was buffered with urea/lactic acid to pH 4.5, then heat treated by heating to 67–70° C. for 7–9 hours, then allowed to cool to ambient temperature. This heat treatment process is described in Ser. No. 08/018,858, filed Feb. 12, 1993. The standard viscosity of the polymeric microemulsion was 2.51 prior to spray drying. The resulting polymer microemulsion was then spray dried in a 31-inch diameter portable spray dryer using a two-fluid nozzle. The various temperatures and residence time conditions used are described in Table 4. As shown in the Table, the standard viscosity of the polymer granules was within 15% of the standard viscosity of the corresponding heat treated quaternized Mannich polyacrylamide microemulsion. The levels of residuals in the dry product were as follows: formaldehyde: 510 ppm; methyl chloride: less than 100 ppm; dimethylamine hydrochloride: 7500 ppm; trimethylamine hydrochloride: 6928 ppm; tetramethylammonium hydrochloride: 4671 ppm.

EXAMPLE 15

Granules of quaternized Mannich polyacrylamide were obtained by the spray drying process of Example 2. To 97.5 parts of these granules was added 2.5 parts of sodium carbonate in a suitable vessel. The vessel was mechanically shaken for 30 minutes to form a composition containing substantially dry granules of quaternized Mannich polyacrylamide and sodium carbonate.

EXAMPLE 16

Granules of quaternized Mannich polyacrylamide were obtained by the spray drying process of Example 14 and then sodium carbonate was added according to Example 15. Solutions of the granules were prepared by dissolving 0.2 parts of the granules in 100 parts water. The dry granules took approximately 1 hour to dissolve. A sample of the heat treated polymer microemulsion described in Example 14 was also dissolved in water to produce a similar polymer concentration. Both polymers were allowed to stir in water for two hours, then were tested for their ability to flocculate suspended solids using a 2.0% solids digested sewage sludge. Approximately 200 parts of the sludge was mixed at about 1000 rpm with various amounts of the polymer solutions, ranging from 10 parts to 50 parts, for about 5 seconds. Thereafter, the drainage rates of the flocculated solids were measured at 10, 20 and 30 seconds. The polymer products both performed equally well in the dose range of 25 to 30 pounds of polymer per ton of sludge.

EXAMPLE 17

Granules of quaternized Mannich polyacrylamide comprising a base—sodium bicarbonate—was compared with granules of quaternized Mannich polyacrylamide which did not comprise an added base or buffer according to the instant invention. Standard viscosity, a parameter known in the art to directly correlate with polymer performance, e.g., flocculation, was measured and used as the basis for comparison. Granules of quaternized Mannich polyacrylamide were prepared according to Example 15. The standard viscosity of these granules was determined, without adjustment of the pH, to be 2.45 cps. In comparison, the standard viscosity (measured without pH adjustment) of granules of quaternized Mannich polyacrylamide prepared by the procedure of Example 2, which did not contain a base, was measured as 1.3.

EXAMPLE 18

A quaternized Mannich polyacrylamide microemulsion (Cat.PAM) was prepared as follows:

Preparation of polyacrylamide microemulsion: To 143.75 parts of Isopar G, 26.28 parts Atlas G-1086 and 6.57 parts Arlacel 83, were slowly added 172.93 parts of a pH 3.0 aqueous solution containing acrylamide (148.2 parts of 53.3% solution), sodium bromate (1.16 parts of 1% solution), 0.68 parts isopropanol, and ethylenediaminetetraaceteic acid (0.40 parts of 40% solution) with stirring. The resulting monomer microemulsion was sparged for 40 minutes with nitrogen. $SO_2$ gas was then bubbled into the resultant microemulsion and the polymerization temperature was kept below 65° C. The resulting product was a clear stable microemulsion having a standard viscosity of 3.07 centipoise.

EXAMPLE 19

The procedure of Example 18 was followed except that Isopar G recovered by following the process of Examples 9–13 was used in place of the fresh Isopar G. The resulting product was a clear stable microemulsion having a standard viscosity of 3.03 centipoise, virtually the same standard viscosity as was obtained using fresh Isopar G (Example 18).

TABLE 4

| No. | Elmusion Name | Gas Inlet/Outlet Temperature ° C. | Volatiles (LOD), % | Residence Time, sec. | Polymer Emulsion Standard Viscosity, cps | Dry Product Standard Viscosity, cps. | Change in Standard Viscosity, % |
|---|---|---|---|---|---|---|---|
| 14 | Cat.PAM (heat treated) | 200/92 | 5.6 | 14 | 2.51 | 2.17 | −13.5 |

EXAMPLE 20

Preparation of structured 2-Acryloxyethyltrimethylammonium Chloride/Acrylamide Copolymer (45/55 mole %) Inverse Emulsion Polymerization Procedure The oil phase and aqueous phase enumerated below are prepared separately. Thereafter they are combined and homogenized to yield a monomer emulsion. The monomer emulsion is purged with nitrogen and $SO_2$ is bubbled through the emulsion at a rate sufficient to bring the emulsion temperature up to and maintained at 40° C. This is continued until the polymerization is complete. The emulsion is cooled to room temperature and Malic acid and Ethoxylated alcohol-60% EO are then added with stirring.

| Oil Phase: | |
|---|---|
| Low odor paraffin oil | 11939 g |
| N,N-bis-(2-hydroxyethyl)oleamide | 524 g |
| Ethoxylated alcohol - 60% EO | 402 g |
| Total Oil Phase: | 12865 g |
| Aqueous Phase: | |
| Acrylamide (50%) | 8844 g |
| Acryloxyethyltrimethyl ammonium Chloride (80%) | 18430 g |
| Ammonium sulfate | 250 g |
| Sulfuric acid (10%) | 230 g |
| Disodium EDTA dihydrate | 19 g |
| 2-Propanol | 245 g |
| Methylene bis(acrylamide) | 0.406 g |
| DI Water | 4021 g |
| t-butyl hydroperoxide (70%) | 0.478 g |
| Total Aqueous Phase (at pH 3.5): | 32039 g |
| Total Monomer Emulsion: | 44904 g |
| Malic acid (50%) | 2300 g |
| Ethoxylated alcohol - 60% EO | 209 g |
| Total Product Emulsion: | 47413 g |

We claim:

1. A composition comprising free flowing, substantially dry polymer granules and a substantially dry base, or a substantially dry buffer, wherein said granules are comprised of a polymer selected from the group consisting of Mannich poly(alk)acrylamide and quaternized Mannich poly(alk)acrylamide.

2. A composition according to claim 1, wherein the amount of buffer ranges from about 0.05% to about 50.0% by weight, based on the total weight of the granules and the amount of base ranges from about 0.05% to about 20.0% by weight, based on the total weight of the granules.

3. A composition according to claim 1 which comprises a base selected from the group consisting of the alkali and alkaline earth metal salts of carbonate, bicarbonate, acetate, phosphate, and citrate.

4. A composition according to claim 1, wherein said base or buffer is present in an amount sufficient to give a solution pH of about 5 to about 11 when said granules are dissolved in water.

5. A composition according to claim 1 which further comprises a water-soluble vinyl addition polymer.

6. A composition according to claim 5 wherein the ratio of said vinyl addition polymer to said quaternized Mannich poly(alk)acrylamide ranges from about 1:10 to 10:1.

7. A composition comprising free flowing, substantially dry, polymer granules and a substantially dry base in an amount ranging from about 0.05% to about 20.0% by weight, based on the total weight of the granules, said granules being comprised of a water-soluble or water-swellable polymer selected from the group consisting of Mannich poly(alk)acrylamide and quaternized Mannich poly(alk)acrylamide.

8. A process for preparing a composition comprising free flowing, substantially dry, water soluble polymer granules comprises:

(1) spray drying a water-soluble polymer-containing emulsion comprised of
  a. a plurality of droplets, said droplets being comprised of Mannich poly(alk)acrylamide or quaternized Mannich poly(alk)acrylamide, and
  b. a volatile hydrocarbon liquid,
  into a gas stream with a residence time of about 8 to about 120 seconds and at an outlet temperature between about 70° C. and about 100° C. to form free flowing, substantially dry, water-soluble polymer granules, and (2) adding an acid, buffer or base to said emulsion prior to or during spray drying or to said granules after spray drying, in an amount sufficient to give a pH of about 5 to about 11 when said granules are dissolved in water.

9. A process according to claim 8 wherein said emulsion is a microemulsion.

10. A process according to claim 8 wherein said residence time is from about 10 to about 60 seconds.

11. A process according to claim 8, which further comprises recovering said volatile hydrocarbon liquid.

12. A process for preparing a composition comprising free flowing, substantially dry, polymer granules from a blend of a water-soluble polymer-containing water-in-oil microemulsion and a water soluble vinyl addition polymer-containing emulsion, which comprises:

(1) spray drying a blend comprising (i) a water-soluble polymer-containing water-in-oil microemulsion, (ii) a water soluble vinyl addition polymer-containing water-in-oil emulsion, said polymer in said microemulsion being selected from the group consisting of Mannich poly(alk)acrylamide and quaternized Mannich poly(alk)acrylamide, and (iii) a volatile hydrocarbon liquid, into a gas stream with a residence time of about 8 to about 120 seconds and at an outlet temperature between about 70° C. and about 100° C. to form free flowing, substantially dry, water-soluble polymer granules, and (2) adding an acid, buffer or base to said granules or to said blend in an amount sufficient to give a pH of about 5 to about 11 when said granules are dissolved in water.

13. A process according to claim 12, wherein said acid, buffer or base is added to said granules.

14. A process according to claim 12, wherein said vinyl addition polymer is a copolymer of acrylamide and dialkylaminoalkylacrylate or quaternized derivatives thereof.

15. A process according to claim 12, wherein said residence time is from about 10 to about 60 seconds.

16. A process according to claim 12, which further comprises recovering said volatile hydrocarbon liquid.

17. A process according to claim 16, wherein said recovered volatile hydrocarbon liquid contains less than one milligram of formaldehyde per kilogram of said recovered volatile hydrocarbon liquid.

18. A composition comprising free flowing, substantially dry polymer granules and a substantially dry buffer or base, wherein the amount of buffer ranges from about 0.05% to about 50.0% by weight, based on the total weight of the polymer granules and the amount of base ranges from about 0.05% to about 20.0% by weight, based on the total weight of the granules, said granules being comprised of a water-soluble vinyl addition polymer and a water-soluble polymer selected from the group consisting of Mannich poly(alk)acrylamide and quaternized Mannich poly(alk)acrylamide.

19. A composition according to claim 18, wherein said water-soluble vinyl addition polymer comprises a copolymer of acrylamide and dialkylaminoalkylacrylate or quaternized derivatives thereof.

20. A composition comprising free flowing substantially dry water-soluble polymer granules and a substantially dry base, said granules being comprised of a water-soluble vinyl addition polymer and a water-soluble polymer selected from the group consisting of Mannich poly(alk)acrylamide and quaternized Mannich poly(alk)acrylamide.

21. A composition according to claim 20, wherein said base is selected from the group consisting of the alkali and alkaline earth metal salts of carbonate, bicarbonate, acetate, phosphate, and citrate.

22. A composition according to claim 20, wherein said base is present in an amount sufficient to give a solution pH of about 5 to about 11 when said composition is dissolved in water.

* * * * *